Patented May 1, 1934

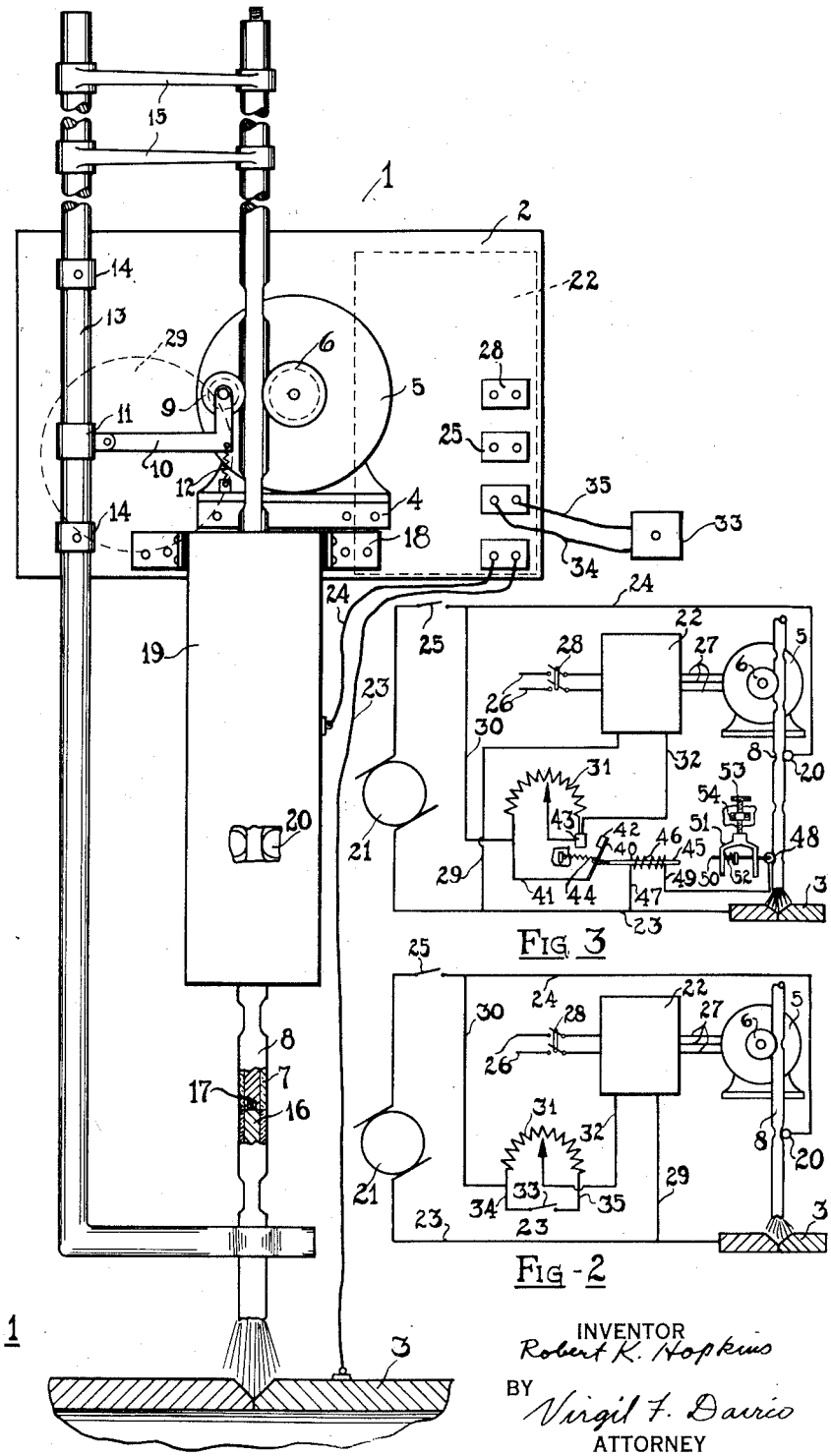

1,957,064

UNITED STATES PATENT OFFICE 1,957,064

WELDING ELECTRODE FEED CONTROL SWITCH

Robert K. Hopkins, New York, N. Y., assignor to M. W. Kellogg Co., New York, N. Y., a corporation of Delaware Application April 20, 1933, Serial No. 666,972

13 Claims. (Cl. 219—8)

This invention relates in general to electric arc welding and in particular to arrangements for controlling the feeding of the welding electrode to the arc.

When electric arc welding is carried on by means of covered electrodes with automatic machines provided with arrangements for maintaining the arc at a predetermined length, the predetermined arc is not maintained when an uncovered portion of the electrode comes into the arc. Instead, the arc lengthens and becomes very noisy. The inability of the arrangements mentioned to maintain the predetermined arc length is due to the fact that the lengthened arc is of the same resistance as the arc of predetermined length. This is probably due to the absence of the protecting gases normally given off by the coating of the electrode. In any event, the arc of increased length is not desired as the characteristics of the metal deposited by it are not the same as those of the metal deposited by the arc of predetermined length. Thus the lengthening of the arc due to uncovered portions of welding electrode results in the production of welds which are not uniform.

The lengthening of the arc is objectionable with all types of covered welding electrodes. It is especially objectionable when the covered welding electrodes have their covering scored or otherwise broken at regular spaced intervals for the purpose of allowing passage of the welding current to the metallic core of the welding electrode. With this type of electrode the tendency to deposit weld metal of non-uniform character is great unless the inability of the arrangements mentioned to maintain the predetermined arc is overcome.

It is an object of this invention to combine with the arrangements at present used to control the feeding of the welding electrode to the arc, means for changing the voltage of the current supplied to the control arrangements when an uncovered portion of the electrode enters the arc so that the control arrangements may maintain the predetermined arc length while the uncovered portion of the welding electrode is consumed.

It is also an object of this invention to provide means adjustably positioned relative to the work for automatically placing resistance in the circuit of the arrangements which control the feeding of the welding electrode as an uncovered portion of the welding electrode enters the arc so that when a covered welding electrode whose non-conducting covering is scored at spaced intervals is used the predetermined arc length will be maintained as the whole of the electrode is consumed.

The further objects and advantages of the invention will be readily appreciated from a consideration of the following description taken with the accompanying drawing, in which, Fig. 1 is a front elevation of an automatic machine to which one form of my invention has been applied, Fig. 2 is a diagrammatic representation of the form of my invention shown in Fig. 1, and Fig. 3 is a diagrammatic representation of another form of my invention.

The invention is applicable to all types of electric arc welding machines designed to employ covered welding electrodes. For the purposes of this application, however, I have chosen to describe the invention in connection with an electric arc welding machine which is designed to employ a continuous covered electrode the non-conducting covering of which is scored at spaced intervals to exposed spaced areas of the core for the passage of the welding current.

The automatic electric arc welding machine 1, shown, includes a panel 2 which is fastened to members, not shown, that support it and the rest of the elements of machine 1. Machine 1 may be fixed in position or may be movable relative to work 3.

To the front of panel 2 is fixed a bracket 4 which supports welding electrode feeding motor 5. Welding electrode feeding wheel 6 has its periphery made of rubber, or similar material, so as not to injure the non-conducting covering 7 of welding electrode 8 and is keyed or otherwise fastened to the shaft of motor 5. On the other side of welding electrode 8 is a wheel 9, similar to wheel 6, which bears on electrode 8 and prevents slippage between welding electrode 8 and wheel 6. Wheel 9 is journalled in a support 10 which is pivoted in member 11. A spring 12, having one end fastened to support 10 and the other end fastened to bracket 4, constantly urges wheel 9 into contact with electrode 8. Member 11 is carried by a support bar 13 which is fastened to brackets 14 secured to panel 2. Support bar 13 carries welding electrode guides 15 at its upper end and has its lower end bent and perforated to guide the lower end of welding electrode 8 to work 3.

Welding electrode 8 is made up of a plurality of easily connectible sections having a metallic core 16 and a non-conducting covering 7. The ends of core 16 of each section are formed into parts of joint forming means, as for instance, the screw joint 17. Non-conducting covering 7 is scored or otherwise removed at spaced points along the length of each section to provide small exposed areas of core 16 through which the welding current may be passed.

Fastened to panel 2 below bracket 4 are brackets 18 which support between them contact device 19, suitable insulation being interposed between brackets and contact device 19 to electrically insulate device 19 from panel 2. Contact device 19 includes a plurality of pairs of contact rollers 20 vertically spaced apart so as to assure constant passage of the welding current from them to the exposed areas of core 16. For a more complete description of contact device 19 reference is made to my copending application Serial No. 660,220 filed March 10, 1933 wherein a contact device similar to contact device 19 is fully shown and described.

Referring now to Figs. 1 and 2. In back of panel 2 is mounted the welding current generator 21, casing 22 which houses the arrangements used to control motor 5 in order to maintain an arc of constant predetermined length, and other motors and controls which since they are not part of this invention will not be particularly referred to. One side of generator 21 is connected by means of cable 23 to work 3, the other side is connected by means of cable 24 to contact device 19 and rollers 20. A switch 25 is included in cable 24 so that the welding circuit may be opened and closed at will.

The current for operating motor 5 passes to the control arrangements in casing 22 through conductors 26 and from casing 22 to motor 5 through conductors 27. A switch 28 is provided on the front side of panel 2 so that the feeding of electrode 8 may be started and stopped. A conductor 29 passes current from cable 23 to the control arrangements within casing 22. A conductor 30 passes current from cable 24 to one end terminal of adjustable resistance 31, the other end terminal being connected through conductor 32 to the control arrangements within casing 22. A normally closed switch 33 is connected to the end terminals of adjustable resistance 31 by means of conductors 34 and 35. Switch 33 may be mounted on the front of panel 2, or conductors 34 and 35 may be of considerable length so that the operator of machine 1 may move it as desired to keep it always within easy reach. In Fig. 2 I have shown adjustable resistance 31 as located outside of casing 22. This has been done in order to simplify the present description and it is to be understood that adjustable resistance 31 may if desired be located within casing 22.

To start the welding operation welding current generator 21 is set in motion and switches 25 and 28 closed. A length of welding electrode 8 is then passed through guides 15 to wheels 6 and 9 which will feed it through contact device 19 and to work 3. The control arrangements within casing 22 are set to maintain an arc of predetermined length and adjustable resistance 31 set to cut in the proper amount of resistance upon the opening of switch 33 to so alter the voltage of the energy passing to conductor 32 and the control arrangements in casing 22 that the control arrangements will maintain the predetermined arc when an uncovered portion of welding electrode 8 enters the arc. If desired adjustable resistance 31 may be so set that the control arrangements upon opening of switch 33 will materially accelerate the feeding of welding electrode 8 and the uncovered portions of welding electrode 8 consumed as rapidly as deemed desirable or necessary.

As welding electrode 8 passes through contact device 19 rollers 20 will contact therewith and pass the welding current through the exposed areas to core 16. After the arc has been struck the control arrangements in casing 22 will control motor 5 as required to maintain the predetermined arc. As welding electrode 8 is consumed and the first of the pairs of exposed areas enter the arc the operator will press the button of switch 33 to open it, thereby changing the voltage of the energy passing to the control arrangements in casing 22 and preventing the undesired lengthening of the arc. When exposed areas are consumed the operator releases the button of switch 33 to allow it to close and shunt out adjustable resistance 31. This procedure will be repeated every time a pair of exposed areas of welding electrode 8 enters the arc. As the top of the first length of welding electrode 8 approaches feeding wheel 6 a second length is passed through guides 15 and united to the first length, care being taken to align the exposed areas with those of the first length so that the passage of current to core 16 will be uninterrupted.

The electric arc welding machine diagrammatically shown in Fig. 3 is generally similar to that shown in Figs. 1 and 2 and above described, however, in this machine means are provided for automatically cutting in adjustable resistance 31 when exposed areas of the welding electrode 8 enter the arc. In Fig. 3 one end terminal of adjustable resistance 31 is connected to the pivoted end of switch 40 by means of conductor 41. The free end of switch 40 carries a contactor 42 which is adapted to contact with contactor 43 fastened to the other end terminal of adjustable resistance 31. Switch 40 is normally held in closed position by means of a spring 44 which is anchored to a fixed portion of the machine. To switch 40 is also connected, through a suitable link, a rod 45 which is moved to open switch 40 when solenoid 46 is energized. Solenoid 46 has one end connected to cable 23 by conductor 47 and the other end connected to roller 48 by conductor 49.

Roller 48 is mounted for rotation on a rod 50 which is supported for axial movement only in a yoke 51. A washer is fixed to rod 50 and cooperates with a spring 52 that constantly urges rod 50 toward welding electrode 8. Yoke 51 includes a threaded bushing into which screws adjustment screw 53. Screw 53 also passes through a threaded member 54 which is fixed against movement. Means, not shown, are provided to prevent rotation of yoke 51 about the axis of screw 53 as screw 53 is rotated to raise or lower yoke 51. Yoke 51 and its cooperating parts are preferably located in a housing which may be fastened to the top of contact device 19. For the purpose of this disclosure adjustable resistance 31, switch 40 and solenoid 46 have been shown as outside of casing 22, if desired these parts may be located within casing 22.

The arc welding machine of Fig. 3 operates as described in connection with the machine of Figs. 1 and 2, however prior to starting the operation of the machine screw 53 is manipulated to bring roller 48 in such a position that it will enter an exposed area when a pair of exposed areas begin to come into the arc. Thus, as a pair of exposed areas begin to come into the arc roller 48 will contact with core 16 to close the circuit of solenoid 46 thereby opening switch 40 to cut adjustable resistance 31 into the circuit of the control arrangements in casing 22, and as a pair of exposed areas are consumed rollers 48 will break contact with core 16 to open the circuit of solenoid 46 thereby allowing spring 44 to close switch 40 and shunt adjustable resistance 31.

When welding in a shallow groove a single adjustment of roller 48 is all that is necessary. However, when welding in a groove which requires several layers of weld metal to fill it the adjustment of roller 48 is changed at the end of the deposition of each layer to compensate for the decreased distance between the groove bottom and roller 48.

I claim:

1. In combination with electric arc welding apparatus adapted to employ a covered welding electrode whose covering is broken at spaced intervals to expose portions of the core, means for feeding said electrode to the arc, means for controlling said electrode feeding means to maintain an arc of predetermined length and means for preventing lengthening of the arc when an uncovered portion of the core of said electrode enters the arc.

2. In combination with electric arc welding apparatus adapted to employ a covered welding electrode whose covering is broken at spaced intervals to expose portions of the core, means for feeding said electrode to the arc, means for controlling said electrode feeding means to maintain an arc of predetermined length and means for accelerating the feeding of said electrode when an uncovered portion of the core of said electrode enters the arc.

3. In combination with electric arc welding apparatus adapted to employ a covered welding electrode whose covering is broken at spaced intervals to expose portions of the core, means for feeding said electrode to the arc, means for controlling said electrode feeding means to maintain an arc of predetermined length and means for maintaining said arc of predetermined length when an uncovered portion of the core of said electrode enters said arc.

4. In combination with electric arc welding apparatus, a covered welding electrode whose covering is broken at spaced intervals to expose portions of the core, welding current supply means, means for feeding said electrode to the arc, means for passing welding current to said electrode, means for controlling said electrode feeding means to maintain an arc of predetermined length, said control means including electrical connections to said welding current supply means, and means for changing the voltage of the energy passing to said control means when an exposed portion of the core of said electrode enters the arc.

5. In combination with electric arc welding apparatus, a covered welding electrode whose covering is broken at spaced intervals to expose portions of the core, welding current supply means, means for feeding said electrode to the arc, means for passing welding current to said electrode, means for controlling said electrode feeding means to maintain an arc of predetermined length, said control means including electrical connections to said welding current supply means, and means for reducing the voltage of the energy passing to said control means as required to prevent lengthening of the arc when an exposed portion of the core of said electrode enters the arc.

6. In combination with electric arc welding apparatus, a covered welding electrode whose covering is broken at spaced intervals to expose portions of the core, welding current supply means, means for feeding said electrode to the arc, means for passing current from said supply means to said electrode, means for controlling said electrode feeding means to maintain an arc of predetermined length and means electrically connecting said control means to said supply means, said connecting means including a resistance for reducing the voltage of the energy flowing to said control means when an exposed portion of the core of said electrode enters the arc.

7. In combination with electric arc welding apparatus, a covered welding electrode whose covering is broken at spaced intervals to expose portions of the core, welding current supply means, means for feeding said electrode to the arc, means for passing current from said supply means to said electrode, means for controlling said electrode feeding means to maintain an arc of predetermined length and means electrocally connecting said control means to said supply means, said connecting means including a normally shunted resistance, and means for cutting in said resistance to reduce the voltage of the energy flowing to said control means when an exposed portion of the core of said electrode enters the arc.

8. In combination with electric arc welding apparatus, a covered welding electrode whose covering is broken at spaced intervals to expose portions of the core, welding current supply means, means for passing current from one side of said supply means to said electrode, means for feeding said electrode to the arc, means for controlling said feeding means to maintain an arc of predetermined length, said controlling means including an electrical circuit connected to each side of said supply means, an adjustable resistance in said circuit and a normally closed switch across said resistance whereby when an exposed portion of the core of said electrode enters the arc said switch may be opened to reduce the voltage of the energy flowing to said control means.

9. In combination with electric arc welding apparatus, a welding electrode comprising a metallic core and a non-conducting covering therefor broken at spaced intervals to expose small areas of said core, welding current supply means, means for passing welding current to the metallic core of said electrode through said exposed areas, means for feeding said electrode to the arc, means for controlling said feeding means to maintain an arc of predetermined length, means for preventing lengthening of the arc when said exposed small areas enter the arc, and means for renderinng said preventing means effective when said exposed areas enter the arc.

10. In combination with electric arc welding apparatus; a welding electrode comprising a metallic core and non-conducting covering therefor broken at spaced intervals to expose small areas of said core; welding current supply means; means for passing welding current to the metallic core of said electrode through said exposed areas; means for feeding said electrode to the arc; means for controlling said feeding means to maintain an arc of predetermined length; means for preventing lengthening of the arc when said exposed small areas enter the arc; and means adapted to contact with said exposed areas on their way to the arc for rendering said preventing means effective, so positioned that it will contact with one of said exposed areas as another of said exposed areas enters the arc.

11. In combination with electric arc welding apparatus, a welding electrode comprising a metallic core and a non-conducting covering therefor broken at spaced intervals to expose small areas of said core, welding current supply means; means for passing welding current to the metallic core of said electrode through said exposed areas; means for feeding said electrode to the arc; means for controlling said feeding means to maintain an arc of predetermined length; means connecting said control means to one side of said current supply means; means connecting said control means to the other side of said current supply means; an adjustable resistance in one of said connecting means; a switch normally shunting said resistance; and energizable means connected to one side of said current supply means and adapted to connect with the other side of said current supply through said exposed areas to open said switch as said exposed areas enter the arc.

12. In combination with electric arc welding apparatus, a welding electrode comprising a metallic core and a non-conducting covering therefor broken at spaced intervals to expose small areas of said core, welding current supply means, means for passing welding current to the metallic core of said electrode through said exposed areas, means for feeding said electrode to the arc, means for controlling said feeding means to maintain an arc of predetermined length, means connecting said control means to one side of said current supply means, means connecting said control means to the other side of said current supply means, an adjustable resistance in one of said connecting means, a switch normally shunting said resistance, energizable means connected to one side of said current supply means for opening said switch, and means connected to said energizable means adapted to contact with an exposed area on its way to the arc as another exposed area enters the arc to connect said energizable means with the other side of said current supply means.

13. In combination with electric arc welding apparatus, a welding electrode comprising a metallic core and a non-conducting covering therefor broken at spaced intervals to expose small areas of said core, welding current supply means, means for passing welding current to the metallic core of said electrode through said exposed areas, means for feeding said electrode to the arc, means for controlling said feeding means to maintain an arc of predetermined length, means connecting said control means to one side of said current supply means, means connecting said control means to the other side of said current supply means, an adjustable resistance in one of said connecting means, a switch normally shunting said resistance, energizable means connected to one side of said current supply means for opening said switch and means adjustably positioned relative to the arc connected to said energizable means and adapted to contact with an exposed area on its way to the arc as another exposed area enters the arc to connect said energizable means with the other side of said current supply means.

ROBERT K. HOPKINS.